United States Patent
Zeng et al.

(10) Patent No.: US 11,245,896 B1
(45) Date of Patent: Feb. 8, 2022

(54) DEBLOCKING FILTER LEVEL DECISION METHOD

(71) Applicant: REALTEK SEMICONDUCTOR CORPORATION, Hsinchu (TW)

(72) Inventors: Wei-Min Zeng, San Jose, CA (US); Chi-Wang Chai, Cupertino, CA (US); Wei Li, Suzhou (CN); Rong Zhang, Suzhou (CN); Wu-Jun Chen, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/186,025

(22) Filed: Feb. 26, 2021

(51) Int. Cl.
  *H04N 19/117* (2014.01)
  *H04N 19/172* (2014.01)
  *H04N 19/176* (2014.01)
  *H04N 19/80* (2014.01)

(52) U.S. Cl.
  CPC ......... *H04N 19/117* (2014.11); *H04N 19/172* (2014.11); *H04N 19/176* (2014.11); *H04N 19/80* (2014.11)

(58) Field of Classification Search
  None
  See application file for complete search history.

(56) References Cited

U.S. PATENT DOCUMENTS

| | | | |
|---|---|---|---|
| 2018/0295363 A1* | 10/2018 | Nam | H04N 19/85 |
| 2019/0116358 A1* | 4/2019 | Zhang | H04N 19/86 |
| 2020/0162741 A1* | 5/2020 | Byun | H04N 19/117 |

OTHER PUBLICATIONS

Peter de Rivaz, Jack Haughton, "AV1 Bitstream & Decoding Process Specification", Last modified: Jan. 8, 2019, Copyright 2018, The Alliance for Open Media.

* cited by examiner

*Primary Examiner* — Stuart D Bennett
(74) *Attorney, Agent, or Firm* — WPAT, PC

(57) ABSTRACT

Disclosed is a deblocking filter level decision method applicable to an image encoder and used for determining deblocking filter levels of N image frames. The method includes: determining whether a current quantization parameter of a current frame of the N image frames is the same as a previous quantization parameter of any previous frame of the N image frames; if the current quantization parameter is different from the previous quantization parameter, looking up M current deblocking filter reference levels in an established table according to the current quantization parameter and then determining M current deblocking filter levels of the current frame according to the M current deblocking filter reference levels, respectively; and if the current quantization parameter is the same as the previous quantization parameter, determining the M current deblocking filter levels of the current frame according to M previous deblocking filter levels of the previous frame, respectively.

16 Claims, 4 Drawing Sheets

Fig. 3

DEBLOCKING FILTER LEVEL DECISION METHOD

BACKGROUND OF THE INVENTION

1. Field of the Invention

The preset disclosure relates to a deblocking filter operation, especially to a deblocking filter level decision method.

2. Description of Related Art

A deblocking filter (DBF) is for reducing visual defects near an image block boundary. The visual defects can be deemed a blocking effect. The cause of the blocking effect is originated from block artifacts generated by a block-based codec. There are many kinds of block-based codecs such as an H.264/Advanced Video Coding (AVC) codec, an H.265/High Efficiency Video Coding (HEVC) codec, and an Alliance for Open Media (AOMedia) Video 1 (AV1) codec. These codecs use deblocking filters to reduce the influence of the blocking effect during an encoding/decoding operation and thereby improve the video quality. In a decoding phase, a decoder can obtain the deblocking filter level of each image frame by decoding a stream; in an encoding phase, an encoder needs to make a decision with a complicated process to determine the deblocking filter level of each image frame, and then introduce the deblocking filter level to a stream.

Take the deblocking filter level decision manner of the AV1 standard. The AV1 standard establishes sixty-four deblocking filter levels. During an encoding process, the performance of an AV1 encoder is dependent on how fast the AV1 encoder chooses the optimum deblocking filter level from the sixty-four deblocking filter levels. Since an AV1 encoder is requested to choose each of the vertical direction filter level of a luminance component, the horizontal direction filter level of the luminance component, the filter level of a chrominance component, and the filter level of a chroma component from the sixty-four deblocking levels for each image frame, a known method for the AV1 encoder chooses the four kinds of filter levels by full searching; however, this method needs to do calculations 64×4 times to make the deblocking filter decision of each image frame, and such massive calculation is disadvantageous to the real-time hardware encoding performance Another known method for the AV1 encoder tries a deblocking filter level to filter an image frame and observes the filter effect on the image frame with respect to the deblocking filter level, and then tries another deblocking filter level according to the observed filter effect until an optimum deblocking filter level for this image frame is found; however, this method needs to read the data of the image frame repeatedly when trying various deblocking filter levels, and therefore violates the execution of a hardware encoding pipeline process that is based on super blocks, and increases the data-reading burden.

An introduction to the aforementioned AV1 standard is found in the following literature: Peter de Rivaz, Jack Haughton, "AV1 Bitstream & Decoding Process Specification", last modified on 2019-01-08.

SUMMARY OF THE INVENTION

An object of the present disclosure is to provide a deblocking filter level decision method as an improvement over the prior art.

An embodiment of the deblocking filter level decision method of the present disclosure is applied to an image encoder and used for determining deblocking filter levels of N image frames. Each of the N image frames is related to one quantization parameter, and thus the N image frames are related to N quantization parameters, respectively. Each of the N image frames is related to a picture order count (POC), and thus the N image frames are related to N picture order counts. The N image frames includes a first frame, a second frame, and a third frame in order of increasing POC, an order count of the first frame is the minimum one among the N picture order counts, and the N is an integer greater than two. The embodiment includes a first step, a second step, and a third step. The first step is for searching an established table according to a first quantization parameter of the first frame and thereby obtaining four first deblocking filter reference levels, and further for determining four first deblocking filter levels of the first frame according to the four first deblocking filter reference levels, respectively. The second step is for determining four second deblocking filter levels of the second frame according to a second quantization parameter of the second frame. On condition that the second quantization parameter is different from the first quantization parameter, the second step searches the established table according to the second quantization parameter and thereby obtains four second deblocking filter reference levels, and then the second step determines the four second deblocking filter levels according to the four second deblocking filter reference levels, respectively; and on condition that the second quantization parameter is equivalent to the first quantization parameter, the second step determines the four second deblocking filter levels according to the four first deblocking filter levels, respectively. The third step is for determining four third deblocking filter levels of the third frame according to a third quantization parameter of the third frame. On condition that the third quantization parameter is different from any of the first quantization parameter and the second quantization parameter, the third step searches the established table according to the third quantization parameter and thereby obtains four third deblocking filter reference levels, and then the third step determines the four third deblocking filter levels according to the four third deblocking filter reference levels, respectively; on condition that the third quantization parameter is equivalent to the first quantization parameter but different from the second quantization parameter, the third step determines the four third deblocking filter levels according to the four first deblocking filter levels, respectively; and on condition that the third quantization parameter is equivalent to the second quantization parameter, the third step determines the four third deblocking filter levels according to the four second deblocking filter levels, respectively. The deblocking filter level decisions for the other frames of the N image frames can be inferred in accordance with the above description.

Another embodiment of the deblocking filter level decision method is also applied to an image encoder and used for determining deblocking filter levels of N image frames, wherein N is an integer greater than one. The method includes the following steps: determining whether a current quantization parameter of a current frame of the N image frames is the same as a previous quantization parameter of any previous frame of the N image frames; on condition that the current quantization parameter is different from the previous quantization parameter, looking up M current deblocking filter reference levels in an established table according to the current quantization parameter and then determining M current deblocking filter levels of the current frame according to the M current deblocking filter reference levels, respectively; and on condition that the current quantization parameter is the same as the previous quantization parameter, determining the M current deblocking filter levels of the current frame according to M previous deblocking filter levels of the previous frame, respectively. The number "M" is a positive integer.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 3 shows a super block in an image frame.

DETAILED DESCRIPTION OF THE PREFERRED EMBODIMENTS

The deblocking filter (DBF) level decision method of the present disclosure uses a filter level decision of a preceding frame as a reference for a filter level decision of a later frame. Accordingly, the method has no need to do massive calculation and will not violate the execution of a hardware encoding pipeline process.

Figure 1:
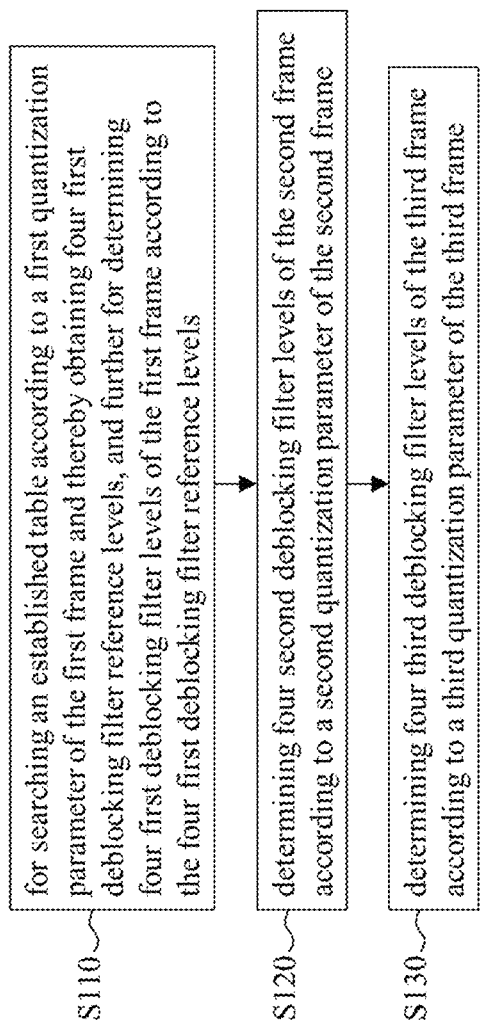
FIG. 1 shows an embodiment of the deblocking filter level decision method of the present disclosure.
Figure 2:
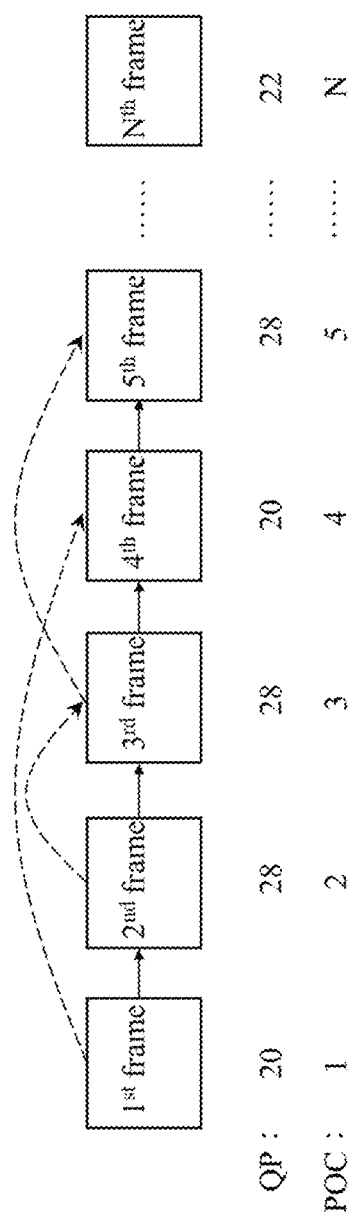
FIG. 2 shows that a filter level decision of a preceding image frame is used as a reference for a filter level decision of a later image frame.

FIG. 1 shows an embodiment of the deblocking filter level decision method of the present disclosure. This embodiment can be executed by a known or self-developed image encoder, and is used for determining deblocking filter levels of N image frames. As shown in FIG. 2, the N image frames (i.e., $1^{st}$ frame~$N^{th}$ frame) are related to N quantization parameters (QPs), respectively. Each of the N image frames is related to a picture order count (POC), and thus the N image frames are related to N picture order counts. The N image frames includes a first frame, a second frame, and a third frame in order of increasing POC (i.e., 1, 2, 3, . . . , N), the order count of the first frame is the minimum one among the N picture order counts, and the N is an integer greater than two. The dashed arrow-line in FIG. 2 indicates that a filter level decision of a preceding frame (e.g., $1^{st}$ frame) is used as a reference for a filter level decision of a later frame (e.g., $4^{th}$ frame), in which the POC of the preceding frame is smaller than the POC of the later frame.

The embodiment of FIG. 1 includes a first step S110, a second step S120, a third step S130 as described below:

(1) The first step S110 is for searching an established table according to a first quantization parameter of the first frame and thereby obtaining four first DBF reference levels, and further for determining four first DBF levels of the first frame according to the four first DBF reference levels, respectively. The established table and the way to search the established table can be realized with a known or self-developed lookup table technique. An example of the first quantization parameter is a quantization parameter mentioned in the aforementioned literature "AV1 Bitstream & Decoding Process Specification".

(2) The second step S120 is for determining four second DBF levels of the second frame according to a second quantization parameter of the second frame. More specifically, in a circumstance that the second quantization parameter is different from the first quantization parameter, the second step searches the established table according to the second quantization parameter and thereby obtains four second DBF reference levels, and then the second step determines the four second DBF levels according to the four second DBF reference levels, respectively; and in a circumstance that the second quantization parameter is equivalent to the first quantization parameter, the second step determines the four second DBF levels according to the four first DBF levels, respectively.

(3) The third step S130 is for determining four third DBF levels of the third frame according to a third quantization parameter of the third frame. More specifically, in a circumstance that the third quantization parameter is different from any of the first quantization parameter and the second quantization parameter, the third step searches the established table according to the third quantization parameter and thereby obtains four third DBF reference levels, and then the third step determines the four third DBF levels according to the four third DBF reference levels, respectively; in a circumstance that the third quantization parameter is equivalent to the first quantization parameter but different from the second quantization parameter, the third step determines the four third DBF levels according to the four first DBF levels, respectively; and in a circumstance that the third quantization parameter is equivalent to the second quantization parameter, the third step determines the four third DBF levels according to the four second DBF levels, respectively.

The deblocking filter level decisions for the other frames of the N image frames can be inferred in accordance with the above description.

On the basis of the above, in an exemplary implementation the four first/second/third DBF reference levels (that are obtained by searching the established table) and the four first/second/third DBF levels (that are obtained through the aforementioned first/second/third step) belong to a first/second/third group of levels, and each group includes filter levels for four kinds of purposes. The filter levels for the four kinds of purposes are: a horizontal direction filter level of a luminance component (a.k.a. the Y component of a general YUV component), a vertical direction filter level of the luminance component, a filter level of a chrominance component (a.k.a. the U component of a general YUV component), and a filter level of a chroma component (a.k.a. the V component of a general YUV component). The first/second/third step determines a deblocking filter level of a certain purpose according to a known deblocking filter reference level/deblocking filter level of the certain purpose.

In an exemplary implementation, the four first DBF reference levels are a $1^{st}$-purpose reference level (e.g., a horizontal direction filter level of a luminance component), a $2^{nd}$-purpose reference level (e.g., a vertical direction filter level of a luminance component), a $3^{rd}$-purpose reference level (e.g., a filter level of a chrominance component), and a $4^{th}$-purpose reference level (e.g., a filter level of a chroma component) that are included in X predetermined filter levels (e.g., the sixty-four filter levels as mentioned in the AV1 standard); and the four first DBF levels are a first DBF $1^{st}$-purpose level, a first DBF $2^{nd}$-purpose level, a first DBF $3^{rd}$-purpose level, and a first DBF $4^{th}$-purpose level. On the basis of the above, the first step includes:

(1-1) choosing Y filter levels from the X predetermined filter levels according to a $K^{th}$-purpose reference level, wherein X (e.g., sixty-four) is an integer greater than Y, and Y (e.g., four) is an integer greater than one.

The ordinal number "$K^{th}$" is any of the ordinal number "$1^{st}$", the ordinal number "$2^{nd}$", the ordinal number "$3^{rd}$", and the ordinal number "$4^{th}$", and thus the $K^{th}$-purpose reference level is the $1^{st}$-purpose/$2^{nd}$-purpose/$3^{rd}$-purpose/$4^{th}$-purpose reference level. The sub-step (1-1) chooses Y filter levels from the X predetermined filter levels according to each of the $1^{st}$-purpose reference level, the $2^{nd}$-purpose reference level, the $3^{rd}$-purpose reference level, and the $4^{th}$-purpose reference level, and thereby chooses 4×Y filter levels in total (i.e., four sets of filter levels, each set having Y filter levels).

(1-2) using each of the Y filter levels, that are selected according to the $K^{th}$-purpose reference level, to perform a filter operation on a target part of the first frame, and then calculating Y error values (e.g., Y sums of squared errors (SSEs)), that are related to the Y filter levels, respectively, according to "the pixel values of the target part of the first frame obtained before the filter operation" and "the pixel values of the target part of the first frame obtained after the filter operation", wherein the target part of the first frame can be some or all of the first frame, and the filter operation is a block-based filter operation (e.g., the deblocking filter operation as mentioned in the AV1 standard).

The sub-step (1-2) performs the filter operation and calculates the error values according to the aforementioned 4×Y filter levels (i.e., the four sets of filter levels), and thereby generates 4×Y error values (i.e., four sets of error values, each set having Y error values).

For instance, the first frame includes super blocks (SBs) (e.g., the super block 300 in FIG. 3); each of the super blocks includes coding units (CUs), also known as transform units (TUs); any two of the coding units having the same sizes or different sizes; and the sub-step (1-2) includes: using each of the Y filter levels to perform the filter operation on 1/Z of each of the super blocks. The number "Z" is greater than zero; for example, Z is an integer equal to or greater than two. In regard to the super block 300 in FIG. 3, the number "Z" is equal to four, and the 1/Z of the super block 300 is the upper-left part of the super block 300.

(1-3) choosing one of the Y error values, that are related to the $K^{th}$-purpose reference level, as a select error value (e.g., the minimum one among the Y error values), and treating a filter level related to the select error value as a first DBF $K^{th}$-purpose level of the four first DBF levels.

The sub-step (1-3) chooses one select error value from each of the aforementioned four sets of error values, and thereby chooses four select error values in total. The four filter levels to which the four select error values are related are used as the four first DBF levels.

It should be noted that since the sub-step (1-2) has no need to ascertain the filter effect of any of the Y filter levels on the first frame when using the Y filter levels to perform the filter operation, the first step will not violate the execution of a hardware encoding pipeline process that is based on super blocks. In other words, the Y filter levels are selected independently, which means that the selection of the Y filter levels can be made in no specific order, and thus it's not necessary to ascertain the filter effect of any of the Y filter levels in advance for the selection; for example, the selection of two or more of the Y filter levels can be made simultaneously. It should also be noted that provided Y=Z=4, the calculation amount of this exemplary implementation is only $$\frac{4}{64} \times \frac{1}{4} = \frac{1}{64}$$

times the calculation amount of the conventional full searching manner.

In the above exemplary implementation, the X predetermined filter levels are from a $0^{th}$ predetermined filter level to an $(X-1)^{th}$ predetermined level in sequence (e.g., $0^{th}$ filter level to $63^{rd}$ filter level as mentioned in the AV1 standard); the Y filter levels includes a $P^{th}$ level, a $Q^{th}$ level, an $R^{th}$ level, and an $S^{th}$ level; and each of P, Q, R, and S is a positive integer. The $P^{th}$ level is equivalent to the aforementioned $K^{th}$-purpose reference level. The $Q^{th}$ level is a $(P+T)^{th}$ level of the X predetermined filter levels, and T is a positive integer; if (P+T) is greater than or equal to X, let (P+T) be equal to (X−1) or X, but the present invention is not limited thereto. The $R^{th}$ level is a $(P−T)^{th}$ level of the X predetermined filter levels; if (P−T) is smaller than zero, let (P−T) be equal to zero, but the present invention is not limited thereto. The $S^{th}$ level is obtained by searching the established table according to the first quantization parameter, and it is equivalent to the aforementioned $K^{th}$-purpose reference level. Through the aforementioned filter operation and the aforementioned calculation and selection of error values, one of the $P^{th}$ level, the $Q^{th}$ level, the $R^{th}$ level, and the $S^{th}$ level is selected as the first DBF $K^{th}$-purpose level.

It should be noted that the Y filter levels may include other levels (e.g., the $(P+2T)^{th}$ level and the $(P−2T)^{th}$ level) as options. One or more of the $P^{th}$ level, the $Q^{th}$ level, the $R^{th}$ level, and the $S^{th}$ level can be omitted according to the demand for implementation. The values of P, Q, R, S, and T can be determined according to the demand for implementation. In an exemplary implementation, T is determined in the following manner: when the frame number ($F_{NUM}$) of a current frame is smaller than (2×Y+1), letting T be equal to [(2×Y+1)−$F_{NUM}$+1]; when the frame number of the current frame is between (2×k×Y+1) and [2×(k+1)×Y](i.e., (2×k×Y+1)≤$F_{NUM}$≤[2×(k+1)×Y]), letting T be equal to the larger one among [Y+1]+2×k×Y−$F_{NUM}$+1] and one, wherein the number "k" is a positive integer, and when the number "k" increases progressively, the number "T" may vary with the number "k".

For instance, the X predetermined filter levels are the sixty-four filter levels as mentioned in the AV1 standard; the Y filter levels are four filter levels; the $K^{th}$-purpose reference level is the $15^{th}$ level among the sixty-four filter levels; the number "T" is equal to [(2Y+1)−$F_{NUM}$+1]=[(2×4+1)−1+1] =9; the $P^{th}$ level, the $Q^{th}$ level, the $R^{th}$ level, and the $S^{th}$ level are the $15^{th}$ level, the $(15+9)^{th}$ level=$24^{th}$ level, the $(15−9)^{th}$ level=$6^{th}$ level, and the $15^{th}$ level respectively; through the filter operation and the calculation and selection of error values as stated in the sub-step (1-2) and sub-step (1-3), one of the $P^{th}$ level, the $Q^{th}$ level, the $R^{th}$ level, and the $S^{th}$ level is selected as the first DBF $K^{th}$-purpose level (e.g., the $R^{th}$ level=$24^{th}$ level).

In an exemplary implementation, if the second quantization parameter is different from the first quantization parameter, the second step is similar to the first step. In an exemplary implementation, if the third quantization parameter is different from any of the first quantization parameter and the second quantization, the third step is similar to the first step. People having ordinary skill in the art can appreciate the detail and modification of the second step and the third step according to the embodiment of FIG. 1 and the description of the first step.

In an exemplary implementation, provided the second quantization parameter is the same as the first quantization parameter, the second step includes:

(2-1) choosing Y filter levels from the X predetermined filter levels according to the first DBF $K^{th}$-purpose level, wherein the ordinal number "$K^{th}$" is any of the ordinal number "$1^{st}$", the ordinal number "$2^{nd}$", the ordinal number "$3^{rd}$", and the ordinal number "$4^{th}$", X (e.g., sixty-four) is an integer greater than Y, and Y (e.g., four) is an integer greater than one.

(2-2) using each of the Y filter levels, that are selected according to the first DBF $K^{th}$-purpose level, to perform a filter operation on a target part of the second frame, and then calculating Y error values (e.g., Y SSEs), that are related to the Y filter levels, respectively, according to "the pixel values of the target part of the second frame obtained before the filter operation" and "the pixel values of the target part of the second frame obtained after the filter operation", wherein the target part of the second frame can be some or all of the second frame, and the filter operation is a block-based filter operation.

(2-3) choosing one of the Y error values, that are related to the first DBF $K^{th}$-purpose level, as a select error value (e.g., the minimum one among the Y error values), and treating a filter level related to the select error value as a second DBF $K^{th}$-purpose level of the four second DBF levels.

Since people having ordinary skill in the art can appreciate the detail and modification of the sub-step (2-1) and sub-step (2-3) of the second step according to the description of the first step as stated in the preceding paragraphs, repeated and redundant description is omitted here.

In the above exemplary implementation, the X predetermined filter levels are from a $0^{th}$ predetermined filter level to an $(X-1)^{th}$ predetermined level in sequence (e.g., $0^{th}$ filter level to $63^{rd}$ filter level as mentioned in the AV1 standard); the Y filter levels includes a $P^{th}$ level, a $Q^{th}$ level, an $R^{th}$ level, and an $S^{th}$ level; and each of P, Q, R, and S is a positive integer. The $P^{th}$ level is equivalent to the aforementioned first DBF $K^{th}$-purpose level. The $Q^{th}$ level is a $(P+T)^{th}$ level of the X predetermined filter levels, and T is a positive integer; if $(P+T)$ is greater than or equal to X, let $(P+T)$ be equal to $(X-1)$ or X, but the present invention is not limited thereto. The $R^{th}$ level is a $(P-T)^{th}$ level of the X predetermined filter levels; if $(P-T)$ is smaller than zero, let $(P-T)$ be equal to zero, but the present invention is not limited thereto. The $S^{th}$ level is obtained by searching the established table according to the second quantization parameter. Through the filter operation and the calculation and selection of error values as stated in the sub-step (2-2) and sub-step (2-3), one of the $P^{th}$ level, the $Q^{th}$ level, the $R^{th}$ level, and the $S^{th}$ level is selected as the second DBF $K^{th}$-purpose level.

For instance, the X predetermined filter levels are the sixty-four filter levels as mentioned in the AV1 standard; the Y filter levels are four filter levels; the first DBF $K^{th}$-purpose level is the $24^{th}$ level among the sixty-four filter levels; the number "T" is equal to $[(2Y+1)-F_{NUM}+1]=[(2\times 4+1)-2+1]=8$; the $P^{th}$ level, the $Q^{th}$ level, the $R^{th}$ level, and the $S^{th}$ level are the $24^{th}$ level, the $(24+8)^{th}$ level=$32^{nd}$ level, the $(24-8)^{th}$ level=$16^{th}$ level, and the $15^{th}$ level respectively; through the filter operation and the calculation and selection of error values as stated in the sub-step (2-2) and sub-step (2-3), one of the $P^{th}$ level, the $Q^{th}$ level, the $R^{th}$ level, and the $S^{th}$ level is selected as the second DBF $K^{th}$-purpose level (e.g., the $P^{th}$ level=$24^{th}$ level).

In an exemplary implementation, provided the third quantization parameter is the same as the second quantization parameter (alternatively, the same as the first quantization parameter but different from the second quantization parameter), the third step includes:

(3-1) choosing Y filter levels from the X predetermined filter levels according to the second (alternatively, first) DBF $K^{th}$-purpose level, wherein the ordinal number "$K^{th}$" is any of the ordinal number "$1^{st}$", the ordinal number "$2^{nd}$", the ordinal number "$3^{rd}$", and the ordinal number $4^{th}$, X (e.g., sixty-four) is an integer greater than Y, and Y (e.g., four) is an integer greater than one.

(3-2) using each of the Y filter levels, that are selected according to the second (alternatively, first) DBF $K^{th}$-purpose level, to perform a filter operation on a target part of the third frame, and then calculating Y error values (e.g., Y SSEs), that are related to the Y filter levels, respectively, according to "the pixel values of the target part of the third frame obtained before the filter operation" and "the pixel values of the target part of the third frame obtained after the filter operation", wherein the target part of the third frame can be some or all of the third frame, and the filter operation is a block-based filter operation.

(3-3) choosing one of the Y error values, that are related to the second (alternatively, first) DBF $K^{th}$-purpose level, as a select error value (e.g., the minimum one among the Y error values), and treating a filter level related to the select error value as a third DBF $K^{th}$-purpose level of the four third DBF levels.

Since people having ordinary skill in the art can appreciate the detail and modification of the sub-step (3-1) and sub-step (3-3) of the third step according to the description of the first step and second step as stated in the preceding paragraphs, repeated and redundant description is omitted here.

In the above exemplary implementation, the X predetermined filter levels are from a $0^{th}$ predetermined filter level to an $(X-1)^{th}$ predetermined level in sequence (e.g., $0^{th}$ filter level to $63^{rd}$ filter level as mentioned in the AV1 standard); the Y filter levels includes a $P^{th}$ level, a $Q^{th}$ level, an $R^{th}$ level, and an $S^{th}$ level; and each of P, Q, R, and S is a positive integer. The $P^{th}$ level is equivalent to the aforementioned second (alternatively, first) DBF $K^{th}$-purpose level. The $Q^{th}$ level is a $(P+T)^{th}$ level of the X predetermined filter levels, and T is a positive integer; if $(P+T)$ is greater than or equal to X, let $(P+T)$ be equal to $(X-1)$ or X, but the present invention is not limited thereto. The $R^{th}$ level is a $(P-T)^{th}$ level of the X predetermined filter levels; if $(P-T)$ is smaller than zero, let $(P-T)$ be equal to zero, but the present invention is not limited thereto. The $S^{th}$ level is obtained by searching the established table according to the third quantization parameter. Through the filter operation and the calculation and selection of error values as stated in the aforementioned sub-step (3-2) and sub-step (3-3), one of the $P^{th}$ level, the $Q^{th}$ level, the $R^{th}$ level, and the $S^{th}$ level is selected as the third DBF $K^{th}$-purpose level.

For instance, the X predetermined filter levels are the sixty-four filter levels as mentioned in the AV1 standard; the Y filter levels are four filter levels; the second (alternatively, first) DBF $K^{th}$-purpose level is the $24^{th}$ level among the sixty-four filter levels; the number "T" is equal to $[(2Y+1)-F_{NUM}+1]=[(2\times 4+1)-3+1]=7$; the $P^{th}$ level, the $Q^{th}$ level, the $R^{th}$ level, and the $S^{th}$ level are the $24^{th}$ level, the $(24+7)^{th}$ level=$31^{st}$ level, the $(24-7)^{th}$ level=$17^{th}$ level, and the $15^{th}$ level respectively; through the filter operation and the calculation and selection of error values as stated in the aforementioned sub-step (3-2) and sub-step (3-3), one of the $P^{th}$ level, the $Q^{th}$ level, the $R^{th}$ level, and the $S^{th}$ level is selected as the second DBF $K^{th}$-purpose level (e.g., the $R^{th}$ level=$17^{th}$ level).

Figure 4:
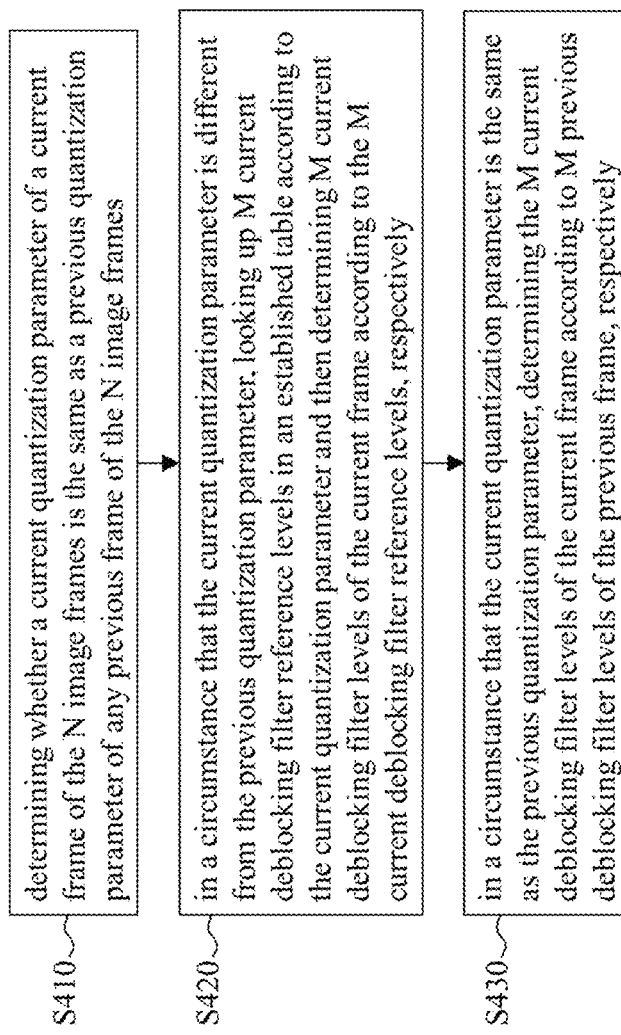
FIG. 4 shows another embodiment of the deblocking filter level decision method of the present disclosure.

FIG. 4 shows another embodiment of the deblocking filter level decision method of the present disclosure. This embodiment is performed with a known or self-developed image encoder, and is used for determining deblocking filter levels of N image frames. The embodiment of FIG. 4 includes the following steps:

S410: determining whether a current quantization parameter of a current frame of the N image frames is the same as a previous quantization parameter of any previous frame of the N image frames.

S420: in a circumstance that the current quantization parameter is different from the previous quantization parameter, looking up M current deblocking filter reference levels in an established table according to the current quantization parameter and then determining M current deblocking filter levels of the current frame according to the M current deblocking filter reference levels, respectively. The detail and modification of this step can be inferred from the sub-steps (1-1)~(1-3) of the first step of FIG. 1.

S430: in a circumstance that the current quantization parameter is the same as the previous quantization parameter, determining the M current deblocking filter levels of the current frame according to M previous deblocking filter levels of the previous frame, respectively. The detail and modification of this step can be inferred from the sub-steps (2-1)~(2-3) (alternatively, (3-1)~(3-3)) of the second (alternatively, third) step of FIG. 1.

Figure 3:
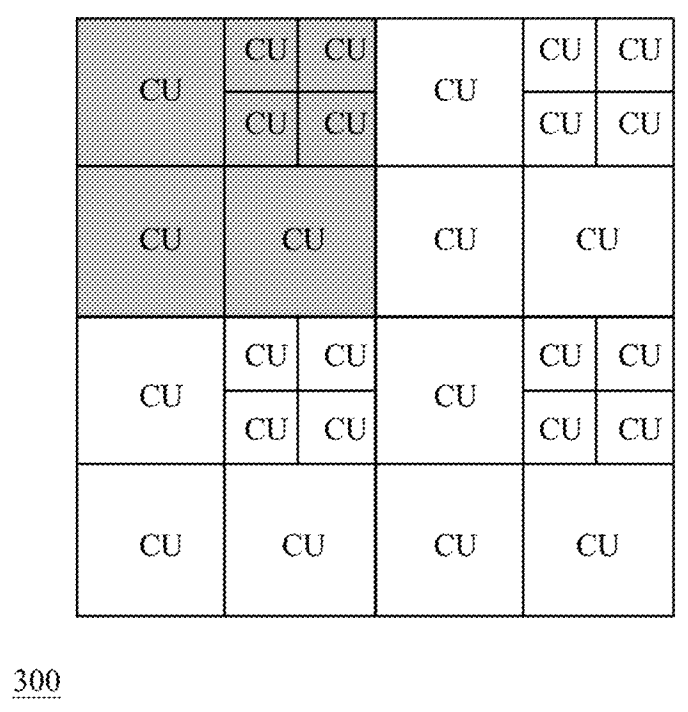

Since those having ordinary skill in the art can refer to the embodiments of FIGS. 1~3 to appreciate the detail and modification of the embodiment of FIG. 4, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the deblocking filter level decision method of the present disclosure has no need to do massive calculation, and won't violate the execution of a hardware encoding pipeline process.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A deblocking filter level decision method applicable to an image encoder and used for determining deblocking filter levels of N image frames, each of the N image frames being related to one quantization parameter and thus the N image frames being related to N quantization parameters, respectively, each of the N image frames being related to a picture order count (POC) and thus the N image frames being related to N picture order counts, respectively, the N image frames including a first frame, a second frame, and a third frame in order of increasing POC, an order count of the first frame being the minimum one among the N picture order counts, the N being an integer greater than two, and the method comprising:

a first step for searching an established table according to a first quantization parameter of the first frame and thereby obtaining four first deblocking filter reference levels, and further for determining four first deblocking filter levels of the first frame according to the four first deblocking filter reference levels, respectively;

a second step for determining four second deblocking filter levels of the second frame according to a second quantization parameter of the second frame, wherein in a circumstance that the second quantization parameter is different from the first quantization parameter, the second step searches the established table according to the second quantization parameter and thereby obtains four second deblocking filter reference levels, and then the second step determines the four second deblocking filter levels according to the four second deblocking filter reference levels, respectively, and in a circumstance that the second quantization parameter is equivalent to the first quantization parameter, the second step determines the four second deblocking filter levels according to the four first deblocking filter levels, respectively; and a third step for determining four third deblocking filter levels of the third frame according to a third quantization parameter of the third frame, wherein in a circumstance that the third quantization parameter is different from any of the first quantization parameter and the second quantization parameter, the third step searches the established table according to the third quantization parameter and thereby obtains four third deblocking filter reference levels, and then the third step determines the four third deblocking filter levels according to the four third deblocking filter reference levels, respectively, in a circumstance that the third quantization parameter is equivalent to the first quantization parameter but different from the second quantization parameter, the third step determines the four third deblocking filter levels according to the four first deblocking filter levels, respectively, and in a circumstance that the third quantization parameter is equivalent to the second quantization parameter, the third step determines the four third deblocking filter levels according to the four second deblocking filter levels, respectively.

2. The method of claim 1, wherein the four first deblocking filter reference levels are a $1^{st}$-purpose reference level, a $2^{nd}$-purpose reference level, a $3^{rd}$-purpose reference level, and a $4^{th}$-purpose reference level that are included in X predetermined filter levels, the four first deblocking filter levels are a first deblocking filter $1^{st}$-purpose level, a first deblocking filter $2^{nd}$-purpose level, a first deblocking filter $3^{rd}$-purpose level, and a first deblocking filter $4^{th}$-purpose level, and the first step includes:

choosing Y filter levels from the X predetermined filter levels according to a $K^{th}$-purpose reference level, wherein $K^{th}$ is any of the ordinal number $1^{st}$, the ordinal number $2^{nd}$, the ordinal number $3^{rd}$, and the ordinal number $4^{th}$, Y is an integer greater than one, and X is an integer greater than Y;

using each of the Y filter levels to perform a filter operation on a target part of the first frame, and then calculating Y error values related to the Y filter levels according to original pixel values and processed pixel values, wherein the target part of the first frame is some or all of the first frame, the filter operation is a block-based filter operation, the original pixel values are pixel values of the target part of the first frame obtained before the filter operation, and the processed pixel values are pixel values of the target part of the first frame obtained after the filter operation; and choosing one of the Y error values as a select error value, and treating a filter level related to the select error value as a first deblocking filter $K^{th}$-purpose level of the four first deblocking filter levels.

3. The method of claim 2, wherein the Y error values are Y sums of squared errors (SSEs).

4. The method of claim 2, wherein the select error value is the minimum one among the Y error values.

5. The method of claim 2, wherein the X predetermined filter levels comply with an AOMedia Video 1 (AV1) standard, and X is sixty-four.

6. The method of claim 2, wherein the first frame includes super blocks, each of the super blocks includes coding units, and the step of using each of the Y filter levels to perform the filter operation on the target part of the first frame includes: using each of the Y filter levels to perform the filter operation on 1/Z of each of the super blocks, in which Z is greater than zero.

7. The method of claim 6, wherein Z is not smaller than two.

8. The method of claim 2, wherein the X predetermined filter levels are from a $0^{th}$ predetermined filter level to an $(X-1)^{th}$ predetermined level in sequence; the Y filter levels includes a $P^{th}$ level, a $Q^{th}$ level, an $R^{th}$ level, and an $S^{th}$ level, and each of P, Q, R, and S is a positive integer; the $P^{th}$ level is equivalent to the $K^{th}$-purpose reference level; the $Q^{th}$ level is a $(P+T)^{th}$ level of the X predetermined filter levels, and T is a positive integer; the $R^{th}$ level is a $(P-T)^{th}$ level of the X predetermined filter levels; and the $S^{th}$ level is obtained by searching the established table according to the first quantization parameter.

9. The method of claim 1, wherein the four first deblocking filter levels are a first deblocking filter $P^t$-purpose level, a first deblocking filter $2^{nd}$-purpose level, a first deblocking filter $3^{rd}$-purpose level, and a first deblocking filter $4^{th}$-purpose level, and in the circumstance that the second quantization parameter is equivalent to the first quantization parameter, the second step includes:

choosing Y filter levels from X predetermined filter levels according to a first deblocking filter $K^{th}$-purpose level, wherein $K^{th}$ is any of the ordinal number $1^{st}$, the ordinal number $2^{nd}$, the ordinal number $3^{rd}$, and the ordinal number $4^{th}$, Y is an integer greater than one, and X is an integer greater than Y;

using each of the Y filter levels to perform a filter operation on a target part of the second frame, and then calculating Y error values related to the Y filter levels according to original pixel values and processed pixel values, wherein the target part of the second frame is some or all of the second frame, the filter operation is a block-based filter operation, and the original pixel values are pixel values of the target part of the second frame obtained before the filter operation, and the processed pixel values are pixel values of the target part of the second frame obtained after the filter operation; and choosing one of the Y error values as a select error value, and treating a filter level related to the select error value as a second deblocking filter $K^{th}$-purpose level of the four second deblocking filter levels.

10. The method of claim 9, wherein the select error value is the minimum one among the Y error values.

11. The method of claim 9, wherein the second frame includes super blocks, each of the super blocks includes coding units, and the step of using each of the Y filter levels to perform the filter operation on the target part of the second frame includes: using each of the Y filter levels to perform the filter operation on 1/Z of each of the super blocks, in which Z is greater than zero.

12. The method of claim 9, wherein the X predetermined filter levels are from a $0^{th}$ predetermined filter level to an $(X-1)^{th}$ predetermined level in sequence; the Y filter levels includes a $P^{th}$ level, a $Q^{th}$ level, an $R^{th}$ level, and an $S^{th}$ level, and each of P, Q, R, and S is a positive integer; the $P^{th}$ level is equivalent to the first deblocking filter $K^{th}$-purpose level; the $Q^{th}$ level is a $(P+T)^{th}$ level of the X predetermined filter levels, and T is a positive integer; the $R^{th}$ level is a $(P-T)^{th}$ level of the X predetermined filter levels; and the $S^{th}$ level is obtained by searching the established table according to the second quantization parameter.

13. The method of claim 1, wherein the four second deblocking filter levels are a second deblocking filter $1^{st}$-purpose level, a second deblocking filter $2^{nd}$-purpose level, a second deblocking filter $3^{rd}$-purpose level, and a second deblocking filter $4^{th}$-purpose level, and in the circumstance that the third quantization parameter is equivalent to the second quantization parameter, the third step includes:

choosing Y filter levels from X predetermined filter levels according to a second deblocking filter $K^{th}$-purpose level, wherein $K^{th}$ is any of the ordinal number $1^{st}$, the ordinal number $2^{nd}$, the ordinal number $3^{rd}$, and the ordinal number $4^{th}$, Y is an integer greater than one, and X is an integer greater than Y;

using each of the Y filter levels to perform a filter operation on a target part of the third frame, and then calculating Y error values related to the Y filter levels according to original pixel values and processed pixel values, wherein the target part of the third frame is some or all of the third frame, the filter operation is a block-based filter operation, and the original pixel values are pixel values of the target part of the third frame obtained before the filter operation, and the processed pixel values are pixel values of the target part of the third frame obtained after the filter operation; and choosing one of the Y error values as a select error value, and treating a filter level related to the select error value as a third deblocking filter $K^{th}$-purpose level of the four third deblocking filter levels.

14. The method of claim 13, wherein the select error value is the minimum one among the Y error values.

15. The method of claim 13, wherein the third frame includes super blocks, each of the super blocks includes coding units, and the step of using each of the Y filter levels to perform the filter operation on the target part of the third frame includes: using each of the Y filter levels to perform the filter operation on 1/Z of each of the super blocks, in which Z is greater than zero.

16. The method of claim 13, wherein the X predetermined filter levels are from a $0^{th}$ predetermined filter level to an $(X-1)^{th}$ predetermined level in sequence; the Y filter levels includes a $P^{th}$ level, a $Q^{th}$ level, an $R^{th}$ level, and an $S^{th}$ level, and each of P, Q, R, and S is a positive integer; the $P^{th}$ level is equivalent to the second deblocking filter $K^{th}$-purpose level; the $Q^{th}$ level is a $(P+T)^{th}$ level of the X predetermined filter levels, and T is a positive integer; the $R^{th}$ level is a $(P-T)^{th}$ level of the X predetermined filter levels; and the $S^{th}$ level is obtained by searching the established table according to the third quantization parameter.

\* \* \* \* \*